(No Model.)
H. M. HOYT.
COPYING PRESS.
No. 493,271. Patented Mar. 14, 1893.
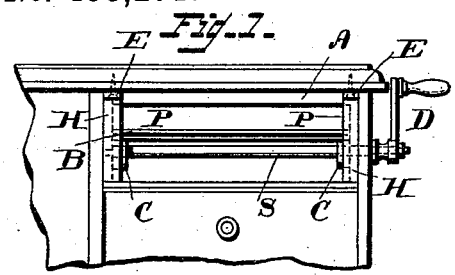
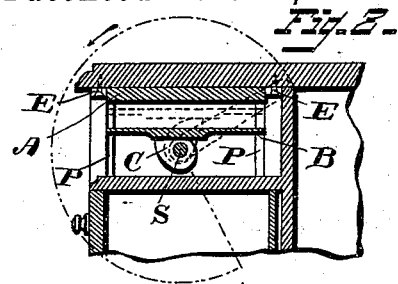
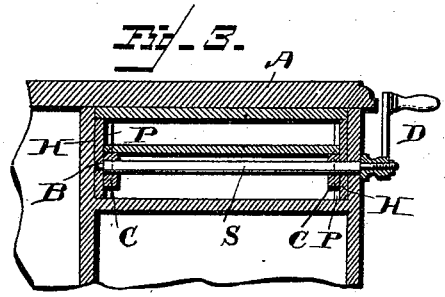
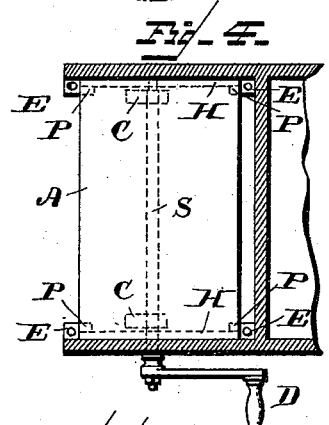
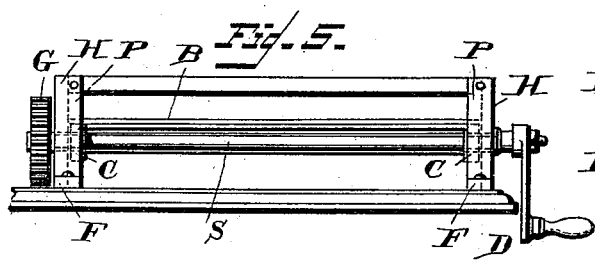
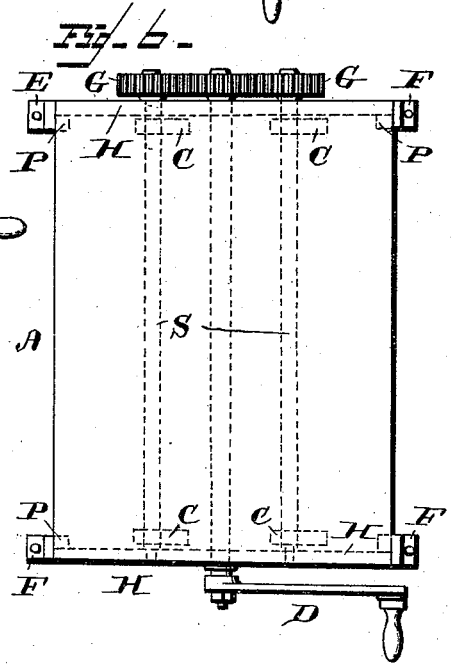
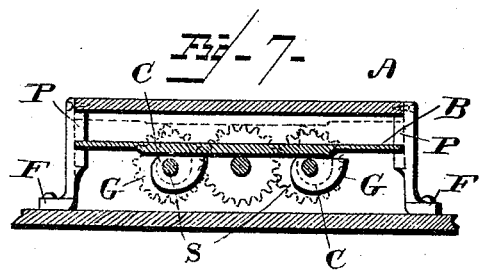
Witnesses
Albert Speiden
J. F. Culverwell
Inventor
Henry Martyn Hoyt
By Attorney Woodbury Lowery

UNITED STATES PATENT OFFICE.

HENRY MARTYN HOYT, OF SPOKANE, WASHINGTON.

COPYING-PRESS.

SPECIFICATION forming part of Letters Patent No. 493,271, dated March 14, 1893.

Application filed September 23, 1892. Serial No. 446,739. (No model.)

*To all whom it may concern:*

Be it known that I, HENRY MARTYN HOYT, a citizen of the United States, residing at Spokane, in the county of Spokane and State of Washington, have invented a new and useful Copying-Press, of which the following is a specification.

My invention relates to improvements in copying presses in which the plates are pressed together by means of cams upon one or more shafts and the objects are (first) to provide an easily operated movement, (second) a compact shape, (third) a flat upper surface upon which to place the book or other matter to be pressed when being prepared or consulted. I attain these objects by means of the mechanism illustrated in the accompanying drawings, in which, Figures 1, 2, 3, and 4 represent a small machine with one shaft. Figs. 5, 6 and 7 represent a large machine with two shafts driven by cog wheel gearing. Fig. 1 is a front view of the machine arranged to take the place of the top drawer of an ordinary desk. Fig. 2 is a transverse vertical section of the same. Fig. 3 is a longitudinal vertical section and Fig. 4 is a horizontal top-view. Fig. 5 is a front view of the larger machine arranged on the top of an ordinary desk or table. Fig. 6 is a horizontal top-view of the same. Fig. 7 is a transverse vertical section of the same.

Similar letters refer to similar parts throughout the several views.

The machine consists of a fixed plate A, a movable plate B, two or more cams C fixed to a shaft or shafts S, turned by a crank D, two brackets H H attached to or a part of plate A, through which bracket pass the shaft or shafts, four or more or less guides P P P P and two or more places for fastening the machine to the table or desk, E E E E and F F F F. I prefer to make the cams C of a spiral shape so as to admit of the uniform rise of the movable plate when the crank is turned.

The operation of the machine is as follows. When the shaft S and the cam C and the plate B are in the position shown in the heavy lines in Figs. 2 and 7, the plate rests upon that side of the cams the outside surface of which is nearest to the shaft and consequently it occupies the lowest position and is ready for the insertion of the letter book or object to be pressed. When the crank is turned in the direction marked by the arrow in Fig. 2, the movable plate B is gradually forced upward by the revolution of the cams C. When the desired pressure is obtained the friction of the cams upon the plate is sufficient to hold the plate in the desired position indefinitely.

In Figs. 5, 6 and 7 exactly the same principle is involved as in Figs. 1, 2, 3, and 4, the only difference being that two shafts are shown, each carrying two cams and operated by cog wheel gearing, conveying the rotary motion from the crank to the two shafts and the cams, thus lifting the plate in an exactly vertical direction. This form of the machine is better adapted, I believe, than the former to large presses. I have also shown two methods of fastening the machine to the desk or table. In Figs. 1, 2, 3, and 4, the machine being fastened to the under side of the top of the table or desk at the points E E E E, in which case it may be made to take the place of a drawer if desired, and in Figs. 5, 6 and 7 the machine being fastened to the upper side of the top of the desk or table at the points F. F F F. In all cases where the machine is attached to the under side of the top of the desk or table, the fixed plate may be dispensed with, provided the top of the desk or table be strong enough to stand the pressure. In such a case the brackets may be screwed to the top of the table direct.

It will be observed that by locating the cams on the shafts adjacent to the sides of the press, as shown in the drawings, and by providing a follower having a lower surface, without central projecting guides or cams, I obtain a free space beneath or below the follower and its shafts in which the press or letter book can be kept, securing a great economy of room when the press is located in a desk-drawer or on the desk top as well as a simplified construction. It is also evident that by locating the pattern above the follower, the latter is withdrawn by gravity thus dispensing with the use of springs, or other appliances for such purpose.

I am aware that prior to my invention copying presses have been made with a fixed plate and movable plate. I therefore do not claim such a combination broadly; but What I do claim as my invention, and desire to secure by Letters Patent, is—

The combination in a desk, of the desk top constituting the upper fixed platen of a copying press, the brackets H H secured to the inner sides of the desk, the guides P P attached to said brackets, the shaft S supported in said brackets and projecting at one extremity outside the desk, the eccentric cams C C rigidly mounted on said shaft adjacent to the sides of the desk, the follower B having an under surface free from depending obstructions and resting upon said cams, and a crank D fitting onto said shaft, exterior to said desk, substantially as described.

HENRY MARTYN HOYT.

Witnesses:
J. M. KINNAIRD,
JOHN C. ONDERDONK.